United States Patent
Zhang et al.

(10) Patent No.: US 9,942,830 B2
(45) Date of Patent: Apr. 10, 2018

(54) SESSION SETUP IN AN ENERGY-EFFICIENT CELLULAR WIRELESS TELECOMMUNICATIONS SYSTEM

(71) Applicants: Koninklijke KPN N.V., The Hague (NL); Nederlandse Organisatie Voor Toegepast-Natuurwetenschappelijk Onderzoek TNO, s-Gravenhage (NL)

(72) Inventors: Haibin Zhang, The Hague (NL); Ljupco Jorguseski, Rijswijk (NL); Job Cornelis Oostveen, Haren (NL)

(73) Assignees: Koninklijke KPN N.V., The Hague (NL); Nederlandse Organisatie Voor Toegepast-Natuurwetenschappelijk Onderzoek TNO, 'S-Gravenhage (NL)

( * ) Notice: Subject to any disclaimer, the term of this patent is extended or adjusted under 35 U.S.C. 154(b) by 0 days.

(21) Appl. No.: 14/903,812

(22) PCT Filed: Jul. 10, 2014

(86) PCT No.: PCT/EP2014/064815
§ 371 (c)(1),
(2) Date: Jan. 8, 2016

(87) PCT Pub. No.: WO2015/004238
PCT Pub. Date: Jan. 15, 2015

(65) Prior Publication Data
US 2016/0165522 A1    Jun. 9, 2016

(30) Foreign Application Priority Data
Jul. 11, 2013  (EP) .................................... 13176110

(51) Int. Cl.
*H04W 48/12*    (2009.01)
*H04W 72/00*    (2009.01)
(Continued)

(52) U.S. Cl.
CPC ........... *H04W 48/12* (2013.01); *H04W 48/20* (2013.01); *H04W 72/005* (2013.01);
(Continued)

(58) Field of Classification Search
CPC .. H04W 48/12; H04W 72/002; H04W 72/005
See application file for complete search history.

(56) References Cited

U.S. PATENT DOCUMENTS

| 5,390,339 A | 2/1995 | Bruckert et al. |
|---|---|---|
| 9,307,485 B2 | 4/2016 | Jorguseski et al. |

(Continued)

FOREIGN PATENT DOCUMENTS

| CN | 1863382 | 11/2006 |
|---|---|---|
| EP | 1 708 439 | 10/2006 |

(Continued)

OTHER PUBLICATIONS

Notification of Transmittal of the International Search Report and the WrittenOpinion of the International Searching Authority, International Application No. PCT/EP2014/064815 filed Jul. 10, 2014, entitled: "Improved Session Setup in an Energy-Efficient Cellular Wireless Telecommunications System", Date of Communication May 12, 2015.

(Continued)

*Primary Examiner* — Rasheed Gidado
(74) *Attorney, Agent, or Firm* — Hamilton, Brook, Smith & Reynolds, P.C.

(57) ABSTRACT

The present invention provides a random access procedure for establishment of a data connection between a terminal and a SA-cell in an energy-efficient network, such as e.g. a BCG2 network, wherein the total session setup time is shortened. An information request message (IRM) transmission from the mobile terminal is used for selecting the SA-cell that will serve the mobile terminal (i.e. set-up a data (Continued)

session with this SA-cell) and is simultaneously used for performing a 'contention-free-like' random-access procedure towards all candidate SA-cells. In this way performing a $RACH_{SA}$ procedure after selecting a SA cell becomes unnecessary, the random access time is shortened and the uplink resources (at the selected SA-cell) and the uplink transmissions from the terminal are more effectively used.

19 Claims, 3 Drawing Sheets

(51) Int. Cl.
 H04W 76/00 (2009.01)
 H04W 48/20 (2009.01)
 H04W 84/04 (2009.01)
(52) U.S. Cl.
 CPC ........ H04W 76/002 (2013.01); H04W 84/045 (2013.01); Y02B 60/50 (2013.01)

(56) References Cited

U.S. PATENT DOCUMENTS

| | | |
|---|---|---|
| 2003/0013452 A1 | 1/2003 | Hunt et al. |
| 2004/0165563 A1 | 8/2004 | Hsu |
| 2004/0218605 A1 | 11/2004 | Gustafsson |
| 2005/0002373 A1 | 1/2005 | Watanabe et al. |
| 2006/0089964 A1 | 4/2006 | Pandey et al. |
| 2007/0133492 A1 | 6/2007 | Baek et al. |
| 2007/0297373 A1 | 12/2007 | Saifullah |
| 2008/0165740 A1 | 7/2008 | Bachman |
| 2008/0227488 A1 | 9/2008 | Zhu et al. |
| 2008/0261570 A1 | 10/2008 | Baker et al. |
| 2009/0061767 A1 | 3/2009 | Horiuchi et al. |
| 2009/0197631 A1 | 8/2009 | Palanki et al. |
| 2009/0239533 A1 | 9/2009 | Somasundaram et al. |
| 2009/0286563 A1 | 11/2009 | Ji et al. |
| 2010/0027510 A1 | 2/2010 | Balasubramanian |
| 2010/0027525 A1 | 2/2010 | Zhu |
| 2010/0075694 A1 | 3/2010 | Damnjanovic |
| 2010/0111062 A1 | 5/2010 | Cho et al. |
| 2010/0130212 A1 | 5/2010 | So et al. |
| 2010/0240365 A1 | 9/2010 | Chen |
| 2010/0260052 A1 | 10/2010 | Cho et al. |
| 2010/0279689 A1 | 11/2010 | Tinnakornsrisuphap |
| 2010/0323663 A1* | 12/2010 | Vikberg ............... H04J 11/0093 455/410 |
| 2011/0053617 A1 | 3/2011 | Lee et al. |
| 2011/0090831 A1 | 4/2011 | Howard |
| 2011/0105116 A1 | 5/2011 | Kim |
| 2011/0117889 A1* | 5/2011 | Burgess ............... H04W 48/06 455/413 |
| 2011/0143755 A1 | 6/2011 | Khaledul et al. |
| 2011/0151886 A1 | 6/2011 | Grayson et al. |
| 2011/0223915 A1 | 9/2011 | Kwack et al. |
| 2011/0225440 A1 | 9/2011 | Kwon |
| 2011/0237239 A1 | 9/2011 | Chou et al. |
| 2011/0294493 A1 | 12/2011 | Nagaraja |
| 2012/0009936 A1 | 1/2012 | Ishii et al. |
| 2012/0028637 A1 | 2/2012 | Kashikar |
| 2012/0034913 A1 | 2/2012 | Wamg |
| 2012/0058771 A1 | 3/2012 | Yu |
| 2012/0077517 A1 | 3/2012 | Suzuki |
| 2012/0100884 A1 | 4/2012 | Radulescu |
| 2012/0201164 A1 | 8/2012 | Jongren et al. |
| 2012/0225638 A1 | 9/2012 | Barnes |
| 2012/0258757 A1 | 10/2012 | Qiu |
| 2013/0039195 A1 | 2/2013 | Weng et al. |
| 2013/0267234 A1* | 10/2013 | Choi ............... H04W 36/0005 455/437 |
| 2014/0050129 A1 | 2/2014 | Magadi Rangaiah |
| 2014/0177492 A1* | 6/2014 | Sun ............... H04L 5/0094 370/280 |
| 2014/0179324 A1 | 6/2014 | Lee et al. |
| 2014/0293950 A1 | 10/2014 | Benjebbour |
| 2014/0315549 A1 | 10/2014 | Zhang et al. |
| 2014/0335882 A1* | 11/2014 | Lee ............... H04W 76/025 455/452.2 |
| 2014/0364116 A1* | 12/2014 | Jorguseski ............... H04W 48/20 455/434 |
| 2015/0151886 A1* | 6/2015 | Kim ............... B65D 41/0485 215/252 |
| 2015/0230236 A1* | 8/2015 | Zeng ............... H04L 41/0806 370/329 |
| 2016/0192279 A1 | 6/2016 | Jorquseski et al. |

FOREIGN PATENT DOCUMENTS

| | | |
|---|---|---|
| EP | 1 796 409 | 6/2007 |
| EP | 1 887 822 | 2/2008 |
| EP | 2 056 609 A1 | 5/2009 |
| EP | 2 211 506 | 7/2010 |
| EP | 2 282 583 | 2/2011 |
| JP | 2001-160813 A | 6/2001 |
| JP | 2005-269109 | 9/2005 |
| JP | 2007-74304 | 3/2007 |
| JP | 2007-266876 | 10/2007 |
| JP | 2010-166475 | 7/2010 |
| JP | 2011-091748 | 5/2011 |
| JP | 2011-101361 | 5/2011 |
| JP | 2011-176588 | 9/2011 |
| WO | WO 2004/091246 | 10/2004 |
| WO | WO 2006/106692 | 10/2006 |
| WO | WO 2008/023609 | 2/2008 |
| WO | WO 2009/022533 | 2/2009 |
| WO | WO 2009/022951 | 2/2009 |
| WO | WO 2009/082076 | 7/2009 |
| WO | WO 2010/078210 | 7/2010 |
| WO | WO 2010/078271 | 7/2010 |
| WO | WO 2010/084282 | 7/2010 |
| WO | WO 2010/117235 | 10/2010 |
| WO | WO 2013/037842 A1 | 3/2013 |
| WO | WO 2013/037875 A1 | 3/2013 |
| WO | WO 2013/068362 | 5/2013 |
| WO | WO 2013/068368 | 5/2013 |
| WO | WO 2013/068369 | 5/2013 |

OTHER PUBLICATIONS

Extended European Search Report, International Application No. PCT/EP2014/064815 filed Jul. 10, 2014, entitled: "Improved Session Setup in an Energy-Efficient Cellular Wireless Telecommunications System", Date of Communication Feb. 5, 2014.
"LTE; Evolved Universal Terrestrial Radio Access (E-UTRA); Physical Layer Procedures (3GPP TS 36.213, Version 10.2.0 Release 10)", Technical Specification, European Telleecommunications Standards Institute (ETSI), vol. 3GPP RAN 1, No. V10.2.0, chapters 7.1, 8.2, Jun. 1, 2011.
"LTE; Evolved Universal Terrestrial Radio Access (E-UTRA); Potential Solutions for Energy Saving for E-UTRAN (3GPP TR 36.927 version 10.0.0 Release 10)", Technical Report, European Telecommunications Standards Institute (ETSI), vol. 3GPP RAN 3, No. V10.0.0, chapters 5.1, 6.1, Jul. 1, 2011.
"LTE; Evolved Universal Terrestrial Radio Access (E-UTRA); User Equipment (UE) Procedures in Idle Mode (3GPP TS 36.304 version 10.2.0 Release 10)", Technical Specification, European Telecommunications Standards Institute (ETSI), vol. 3GPP RAN 2, No. V10.2.0, chapter 3.1, 4.15.2, 7, Jun. 1, 2011.
"Node B Measurements for LTE", Nokia Siemens Networks, 3GPP Draft; R1-073682 ENB Meas, 3rd Generation Partnership Project (3GPP), vol. RAN WG1, Athens, Greece; Chapters 2.2, 2.3, Aug. 16, 2007.
Ashraf, Imran, et al., "Improving Energy Efficiency of Femtocell Base Stations Via User Activity Detection", Wireless Communications and Networking Confe3rence (WCNC), 2010 IEEE, pp. 1-5, Apr. 18, 2010.
Mahmud, K., et al., "Mobility Management by Basic Access Network in MIRAI Architecture for Heterogeneous Wireless Systems",

(56) References Cited

OTHER PUBLICATIONS

Globecom '02, 2002—IEEE Global Telecommunications Conference, Nov. 17-21, 2002, vol. 2, Nov. 17, 2002.
Masakatsu, O. et al., "Power Saving Control Method for Battery-Powered Portable Wireless LAN Access Points in an Overlapping BSS Environment," IEICE Transactions on Communications, Communications Society, vol. E94B, No. 3, pp. 658-666, Mar. 1, 2011.

\* cited by examiner

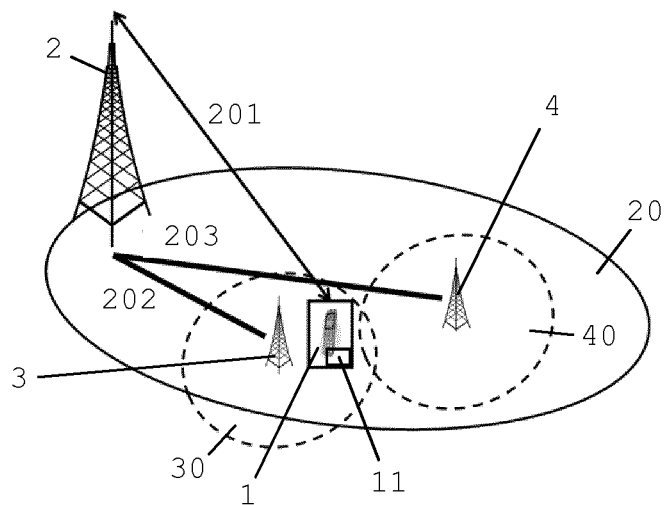
Fig.5
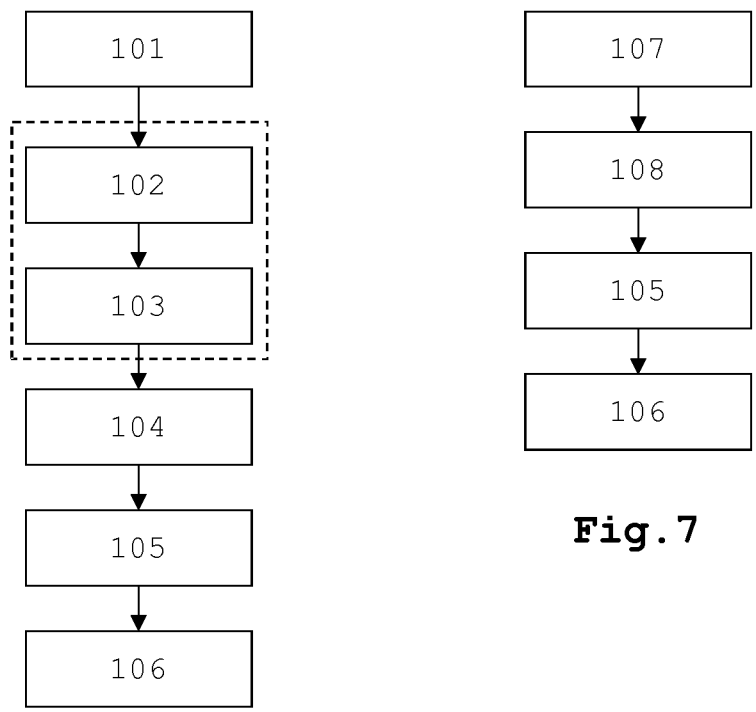
Fig.6
Fig.7

SESSION SETUP IN AN ENERGY-EFFICIENT CELLULAR WIRELESS TELECOMMUNICATIONS SYSTEM

This application is the U.S. National Stage of International Application No. PCT/EP2014/064815, filed Jul. 10, 2014, which designates the U.S., published in English, and claims priority under 35 U.S.C. § § 119 or 365(c) to EP Application No. 13176110.8, filed Jul. 11, 2013. The entire teachings of the above applications are incorporated herein by reference.

FIELD OF THE INVENTION

Generally, the invention relates to the field of wireless telecommunications. More specifically, the invention relates to the field of establishing a data connection between a terminal and a cell in an energy-efficient cellular wireless network.

BACKGROUND

A cellular wireless access telecommunications network (system) typically includes multiple base stations, also known as, for example, base transceiver station (BTS) in GSM, NodeB in WCDMA (UMTS), and evolved NodeB or eNB in LTE. A base station includes at least transmitting and receiving equipment to support wireless communication with a (possibly mobile) terminal, in standardization more formally known as UE (User Equipment). The range that can be covered with the transmitter/receiver in a base station is limited. The area that can be served by the transmitter/receiver of a base station is referred to as its "coverage area" or as the "cell." As used herein, the term "cell" may refer to both the base station itself and to its associated coverage area.

A cell (base station) in a cellular network is typically connected to the remainder of the network via one or more backhaul links, for example, via optical fiber, via copper wire or wirelessly. A base station further includes processing capabilities, for example for the wireless transmission and reception and for handling the protocols specified between the base station and the terminal and between the base station and the network, including other cells.

In a cellular network, different cells may have different sizes, indicated e.g. as macrocells, microcells, picocells or femtocells in decreasing order of cell size. Cells may show a partial overlap with nearby cells or a smaller cell (e.g. picocell) may be entirely overlapped by a larger cell (e.g. macrocell). Multiple cells may thus form a cellular network providing near contiguous coverage in a very large area.

In a cellular network it is common that each cell (base station), when in operation, transmits broadcast signals. Such signals are known as, for example, BCH (Broadcast CHannel) in GSM, as CPICH (Common Pilot CHannel) in WCDMA (UMTS) and as RSs (Reference Signals) in LTE. The same or separate broadcast signals are used to indicate a cell's (base station's) presence and to broadcast information about the cell (system information), for example, the cell identity and information about the configuration of the cell and/or about the cell's resources, such as e.g. which channel to use in order to initiate contact with the cell. Such broadcast signals allow terminals to make measurements on the broadcast signals, e.g. to determine the strength of the signal received by the terminal, and to receive the cell's system information. The broadcast signals are usually transmitted as long as the cell is in operation. The transmit power involved in broadcasting these signals may consume up to 20% of the cell's maximum transmit power, also when the cell does not actually exchange data with a terminal in the cell or when there is no terminal at all in the cell.

In a cellular wireless network it is common to distinguish a terminal to be in an 'idle mode' or in an 'active mode'. In the active mode, the terminal is able to exchange data (e.g. sending/receiving an e-mail or making a phone call) via a cell in which the terminal is located. This requires resources in the network (e.g. frequencies and/or codes) and also requires the terminal and the network to provide power for the purpose. In the idle mode the terminal is not able to exchange data and, therefore, does not require the above resources and consumes less power. A terminal in the idle mode only regularly listens to signals broadcast by the cells and selects a 'best cell', for example the cell with the signal that the terminal receives as strongest. A terminal in the idle mode also monitors the paging channel transmitted by the selected cell for a paging message addressing the terminal. Such an (idle mode) terminal is said to 'camp on' the selected cell. When, for example because of terminal mobility, a different cell is identified as best cell, the terminal may re-select the different cell as 'best cell' and camp on the newly selected cell. It should be noted that a terminal in the idle mode normally does not inform the cell and/or the network about which cell the terminal is camping on, also not when re-selecting a different cell as best cell. When the terminal re-selects to a cell which is found to be in a different location area (LA or RA—routing area), which the terminal may determine from the cell's system information, then the terminal initiates contact with the network via the newly selected cell to perform an LA or RA update procedure, and subsequently returns to the idle mode. Thus, the network is made aware of the LA/RA the idle terminal is located in. A LA/RA commonly comprises multiple cells, as configured by the network operator. Consequently, the network is not aware on which cell an idle mode terminal is camping on, it is only aware in which LA/RA an idle terminal is (expected to be) located.

In a cellular wireless access telecommunications network a terminal and the network need to set up a session when the terminal requests a service or is being paged. This involves a terminal in the idle mode making a transition to the active mode. In an LTE network, for example, a session setup is a two-step process. If service is initiated by the network, the network performs a paging procedure, where a paging message is broadcast in all cells where the network expects the terminal to be camping on (RA/LA). When the terminal receives a paging message addressing the terminal, or if service is initiated by the terminal without having been paged, in a first step the terminal performs a random access channel (RACH) procedure towards the cell it currently is camping on to establish a Radio Resource Control (RRC) connection. When successful, in the second step, the RRC connection with that cell is used to negotiate resources for and to establish a data connection between the terminal and that cell. Then the wireless exchange of user data between the terminal and the cell is possible.

For the LTE network as well as for other legacy networks such as e.g. GSM and UMTS, all transmissions (be it signaling or data) typically occur between the terminal and a single cell which is the same cell that the terminal was camping on when it was in idle mode.

Recently, a new, more energy efficient, network architecture is being developed. One aspect in the new architecture is the use of relatively small cells. High bit rate data connections can be much more efficiently provided with a larger number of (at least partially overlapping) small cells (e.g. microcells, picocells, femtocells) than with a fewer number of larger cells (e.g. macrocells). A further aspect in the new architecture is that the power consumption of a cell is envisioned to scale, as much as possible, with the service actually provided (e.g. with the number of active terminals served, with the bit rate provided to a terminal, with the distance covered by the connection to a terminal, etc.). One approach for realizing this vision includes putting those cells that do not actually serve an active terminal into a power-save mode, e.g. switching those cells almost completely off. Another, complementary, approach includes significantly reducing or refraining from transmitting broadcast signals that are common in conventional networks. The transmission of these broadcast signals causes a large overhead, in particular for cells operating at less than full load.

The new architecture envisions distinguishing between different types of cells. A first type of cells, in this text referred to as 'SA-cell' is primarily optimized to support the wireless exchange of data with active terminals. The energy-efficiency improvements as outlined above are focused on the SA-cells. A second type of cells, in this text referred to as 'LA-cell' is primarily optimized for other functions in a cellular network, including those also found in conventional networks. Thus, it is envisioned to reduce the overhead in the system to that attributed to the LA-cells.

A LA-cell typically covers a larger area, for example comparable to that of a conventional macrocell. The LA-cells together provide near contiguous coverage in the area desired to be covered, much like in a conventional network. A LA-cell may transmit broadcast and system information, much like a conventional cell; an idle terminal may camp on a LA-cell and may also initiate a signaling connection with the LA-cell, e.g. to perform an LA/RA update or to detach from the network.

A SA-cell covers a smaller area, for example comparable to that of a conventional microcell, picocell or femtocell. The SA-cells together may support a certain bit rate in the near-contiguous area desired to be covered. An SA-cell only transmits signals when and in so far it is needed; it may be regarded to be normally 'off' or in a power-save or stand-by mode. An idle terminal also does not camp on a SA-cell. Although such a network has been referred to as a "Beyond Cellular Green Generation" (BCG2) network, this term may change in the future. Therefore, in the context of the present application, a network having such architecture will be referred to as an "energy-efficient cellular wireless network."

In an energy-efficient cellular network, if session setup is network-initiated, this is preceded by the terminal receiving a paging message via the LA-cell it is camping on. The session setup in an energy-efficient cellular network may be sub-divided into two parts. The first part includes the establishment of a signaling connection between the terminal and the LA-cell it currently is camping on, which may include a RACH procedure and RRC connection set-up, similar to legacy networks. After a signaling connection between the terminal and the LA-cell has been established, the second part includes the establishment of a data connection (data session) with an appropriate SA-cell.

Note that, in an energy-efficient network according to this architecture, it may sometimes not be possible to identify an appropriate SA-cell immediately. This may happen e.g. because all SA-cells in the vicinity of the terminal may be in a power-save mode and do not transmit a suitable signal. It may also be the case that some SA-cell is active and that the terminal detects a suitable signal from the SA-cell, but that the active SA-cell cannot optimally support the requested data session from an energy saving perspective (e.g. there is an inactive SA-cell in a better position, e.g. much closer to the terminal). It may also be the case that some SA-cell is active but that the active SA-cell cannot optimally support the requested data session from a quality of service (QoS) perspective (e.g. the active SA-cell cannot support the data session with the requested bit rate, while other inactive SA-cell(s) can).

Setting up a session in a network according to this new architecture is different from that in legacy networks. One difference is that the terminal issues a request message to a 'best LA-cell' an idle terminal is camping on but that this cell is, normally, not going to serve the terminal (i.e., the data connection for exchanging the actual user data is set up with another SA-cell). Another difference is that the SA-cell's RAT (Radio Access Technology) to support the data connection need not be the same as the LA-cell's RAT to support the terminal in idle mode, which allows optimization of one or both RATs separately for their respective primary purposes. Yet another difference is that, in the new architecture, the 'best SA-cell' to support the data connection still needs to be found. Consequently, as a part of the session setup procedure in an energy-efficient network, an appropriate cell (SA-cell) needs to be selected to support the data connection with the terminal. To ensure high quality and/or user experience, the session setup, which includes both identifying an appropriate cell and establishing a data connection with it, is preferably performed quickly.

In existing mobile radio networks, such as LTE, UMTS and GSM networks the terminal performs a random access procedure as initial step of the session set-up. The random access procedure is by default contention-based, where the UE randomly selects from a set of predetermined random access preambles and transmits the selected preamble in a random access slot (in time and/or frequency domain) of the target cell. It should be noted, however, that for LTE there is also a contention-free RACH procedure that can be used in the following time-critical procedures:

a) The terminal performs a handover between the source and the target cell. In this situation it uses a contention free (i.e. a unique) preamble for the uplink random access transmission at the target cell. This is needed to avoid collisions (i.e. more than one terminal is using the same preamble simultaneously) and speed-up the random access as the terminal is in the process of handing over from the source to the target cell.

b) The terminal has to perform uplink (UL) transmission (e.g. sending an ACK) on the uplink for cases when downlink (DL) data transfer is resumed and the uplink synchronization is lost. In order to restore the UL synchronization the terminal performs again collision-free RACH procedure (i.e. it uses a unique random access preamble) in order to speed-up the UL resynchronization as there is limited time to receive the uplink ACK for the transmitted DL data.

The LTE contention-free RACH transmission via the unique (contention-free) access preamble is implemented such that the terminal selects from the set of contention-free preambles broadcast in the system information.

In LTE there are fixed number of 64 RACH preamble signatures (in UMTS this number is not fixed) based on the Zadoff-Chu (ZC) sequence with a particular length. In UMTS the RACH preambles are based on Pseudo Noise (PN) sequences. The ZC sequences enable good detection at cell edge (i.e. low SINR conditions), reduced intra-cell interference from colliding preambles, and acceptable eNodeB receiver complexity.

The 64 RACH preambles are broadcast by the cell as part of system information including indication which portion of the preambles is reserved for contention-free RACH procedure. At mobile or network originated call the terminal randomly selects a RACH preamble (excluding those reserved for contention-free RACH) and a RACH time slot and sends it to the eNodeB. It is possible that more than one UE transmit the same preamble in the same random access slot, leading to a contention-based RACH procedure. Ideally, if there is only one terminal sending its RACH preamble in the particular RACH time slot, then the network can decode it and respond with a Random Access Response (RAR) including the timing advance, Cell Radio Network Temporary Identifier (C-RNTI) that might be definite if there is no collision, and the uplink grant for the subsequent data transmission for the terminal. Note that there is a limited time interval where the terminal expects the RAR, so if the preamble is not detected in case of collisions or bad radio conditions or too low uplink transmit power the terminal retransmits the preamble again. The terminal follows the UL grant and sends a L2/L3 message (e.g. RRC connection set-up) as instructed and includes its own unique identity. Note that in case of collision two (or more) terminals will send its L2/L3 messages on the same uplink resources with their respective identities. At the network side the eNodeB sends an early contention message, addressed to the C-RNTI and echoing the terminal identity decoded in the L2/L3 message received in the previous step. This early contention resolution message supports hybrid automatic repeat requests (HARQ), i.e. it requires ACK feedback from the UE. This ACK feedback is given only by the terminal that has correctly decoded the early contention message and recognized its own identity. Other terminals not recognizing their respective identities understand that there was a collision, transmit no HARQ feedback, quickly exit the current RACH procedure and start another one. Therefore, upon reception of the early contention resolution message the terminal has the following options: (a) the message is correctly received, own identity is detected and ACK is sent (i.e. RACH procedure is finished); (b) the message is correctly received, the identity is not recognized (i.e. contention resolution) and no feedback is sent (e.g. discontinuous transmission DTX); (c) the terminal fails to decode the message or misses the DL grant, no feedback is sent (DTX).

In some time-critical cases (e.g. handover or sending uplink ACK when DL data transfer is resumed), the eNodeB has the option to arrange contention-free access for the UE by assigning the UE a dedicated preamble via a dedicated signaling. Theoretically, it is still possible to have time collision i.e. the active terminal uses the same PRACH resource as with terminal transiting from idle to active. Note that two or more active terminals using the same PRACH resources is not expected as that would mean issuing handover (HO) command or requesting ACK of DL data at exactly the same time instant for two or more mobiles. In this case due to the different preambles and the properties of the Zadoff-Chu (ZC) preamble sequences used, it is still possible to distinct among the different terminals. Contention-free access is generally faster than contention-based access, since it does not require subsequent contention resolution process. It ends when the eNodeB sends the RAR message.

In UMTS, the available PRACH random access slots (totally 14 slots per 20 ms) are grouped into so called RACH sub-channels. Each of the RACH sub-channels is allocated to one of 8 Access Service Classes (ACSs), which denote the priority of the service for which RACH request is being made. The set of available preambles and the set of available RACH sub-channels for each ACS are provided via system information. At random access, the UE randomly select one preamble and one random access slot from the sets corresponding to the given ACS of the service. The UE also has to estimate initial power with which it is to send the selected preamble. After sending the preamble, the UE will listen to the downlink Acquisition Indicator CHannel (AICH) for the acknowledgement of the network. If a positive acknowledgement is detected, the UE transmits the random access message over the PRACH. If a negative acknowledgement is detected, the UE exits the random access procedure. If no positive or negative acknowledgement is detected, due to either collision or too-low uplink transmit power, the UE chooses the next available random access slot and randomly selects a new preamble from the sets corresponding to the given ACS. The UE also increases the transmit power by a predetermined step, and transmit the newly-selected preamble during the newly chosen random access slot.

US patent application US 2008/0261570 discloses the possibility to signal SIB7 information of UMTS in each paging message in order to provide the terminal with the random access parameters in the case of network-originated calls. The SIB7 information includes some random access parameters: Uplink Interference, Dynamic Persistence Level per Physical Random Access Channel and Expiration Time Factor. The purpose is that, in case that the random access parameters the terminal received and stored before are not valid anymore (decided by the parameter Expiration Time Factor), and therefore the terminal does not need to wait for the next transmission of the SIB7 information (typically with transmission period of 80 ms), and thus extra random access delay is avoided. No information of random access slot and preamble is signaled in the paging message.

Patent application WO 2013/037875 discloses, amongst others, user terminals transmitting an information request message (IRM) towards the plurality of the SA-cells in its surroundings. The SA-cells are connected with a (fixed or wireless) backhaul link with the overlaying LA-cell. The IRM based session set-up uses the IRM signal strength measurements at the surrounding SA-cells that are triggered and instructed by the LA-cell to receive the IRM message. The signal strength measurements at the SA-cell receiving the IRM message are reported back to the mobile terminal so the terminal can select the SA-cell or the IRM signal measurements are forwarded via the backhaul link from the receiving SA-cells towards a decision unit in the network that decides which SA-cell should serve the mobile terminal.

It is an object of the present invention to improve the random access procedure for establishment of a data connection between a terminal and a SA-cell in an energy-efficient network, such as e.g. a BCG2 network.

SUMMARY OF THE INVENTION

The present invention provides a random access procedure for establishment of a data connection between a terminal and a SA-cell in an energy-efficient network, such as e.g. a BCG2 network, wherein the total session setup time is shortened.

According to an aspect of the invention a method for facilitating establishment of a data connection in a telecommunication system is proposed. The telecommunication system can comprise a decision unit, a LA-cell, a plurality of SA-cells and a terminal. The method can be for facilitating establishment of a data connection between the terminal and at least one of the plurality of the SA-cells. The method can comprise establishing a signaling connection between the terminal and the LA-cell while the terminal is in an idle mode and is camping on the LA-cell. The method can further comprise transmitting configuration data from the LA-cell to the terminal via the signaling connection while the terminal is in an idle mode and is camping on the LA-cell. The method can further comprise transmitting the configuration data from the LA-cell to the plurality of SA-cells while the terminal is in an idle mode and is camping on the LA-cell. The method can further comprise broadcasting a signal from the terminal in accordance with the configuration data while the terminal is in an idle mode and is camping on the LA-cell. The method can further comprise determining in each of the plurality of SA-cells one or more properties of the signal while the terminal is in an idle mode and is camping on the LA-cell. The properties can be indicative of propagation conditions between the terminal and each of the plurality of SA-cells. The method can further comprise providing a report to the decision unit from each of the plurality of SA-cells (3,4) while the terminal is in an idle mode and is camping on the LA-cell. The report can comprise data indicative of at least a portion of the determined properties.

According to another aspect of the invention a method for one of a plurality of SA-cells in a telecommunication system is proposed. The telecommunication system can comprise a decision unit, a LA-cell, a plurality of SA-cells and a terminal. The method can be for one of the plurality of SA-cells for facilitating establishment of a data connection between the terminal and the SA-cell. The method can comprise receiving configuration data from the LA-cell in the SA-cell while the terminal is in an idle mode and is camping on the LA-cell. The configuration data can be, at least partly, identical to configuration data received from the LA-cell in the terminal while the terminal is in an idle mode and is camping on the LA-cell. The method can further comprise receiving in the SA-cell a broadcasted signal from the terminal while the terminal is in an idle mode and is camping on the LA-cell. The signal can be broadcast in accordance with the configuration data. The method can further comprise determining in the SA-cell one or more properties of the signal while the terminal is in an idle mode and is camping on the LA-cell. The properties can be indicative of propagation conditions between the terminal and the SA-cell. The method can further comprise providing a report to the decision unit from the SA-cell while the terminal is in an idle mode and is camping on the LA-cell. The report can comprise data indicative of at least a portion of the determined properties.

In the context of the embodiments of the present invention, the expressions "LA-cell" and "SA-cell" are used to differentiate between two different types of cells.

The first type of cell, the LA-cell (Large Area cell), refers to a cell that typically is able to cover a larger area with a smaller bit rate, as compared with the second type of cell. The LA-cell is primarily intended for carrying signaling messages from/to a terminal, e.g. the LA-cell is intended to at least be able to page a terminal. A terminal in idle mode may further be assumed to 'camp' on at least one of these LA-cells. While the LA-cell is not primarily intended to be used to carry wireless user data from/to a terminal, it is not precluded that other signaling than paging or that also some user data is carried via an LA-cell. In the intended coverage area of the wireless access network it may be assumed that at least one LA-cell is fully operational or, in other words, an LA-cell is 'normally on.'

The second type of cell, the SA-cell (Small Area cell), refers to a cell that typically is able to cover a smaller area with a higher bit rate, as compared with the LA-cell. The SA-cell is primarily intended to carry user data from/to a terminal over the established data connection (i.e., the SA-cell is primarily intended to handle connections with active terminals). Yet, it is not precluded that also some other information and/or some signaling is carried via an SA-cell. In the intended coverage area of the wireless access network it may be assumed that at least one SA-cell is able to provide coverage. An SA-cell is only fully operational when and to the extent that it is needed or, in other words, an SA-cell is 'normally off.'

According to various embodiments of the present invention, the SA-cells may occur in any mix of frequency bands and/or radio access technologies (RATs). It is also not precluded that there are differently sized SA-cells (e.g. macro, micro, pico and femto SA-cells, with or without a hierarchical organization), where larger SA-cells may e.g. more efficiently serve highly mobile terminals.

As used herein, the expression "data connection between a terminal and an SA-cell" refers to a communication path for a wireless exchange of user data between the terminal and the SA-cell. The communication path for user data, including the section between the terminal and the SA-cell, is usually set up according to a set of parameters, for example, depending on what type of user data needs to be exchanged (e.g. for sending/receiving e-mail, for making a voice or video call, etc.). The set of parameters, commonly referred to in the art as "QoS parameters" or "QoS profile", may include parameters such as e.g. maximum bitrate, guaranteed (minimum) bitrate, bit error ratio and delay/latency.

In contrast, signaling messages exchanged between the terminal and the LA-cell do not contain user data and are exchanged between e.g. the terminal and various entities in the telecommunication system. Signalling messages may be exchanged without establishing a connection or via a "signaling connection" with a modest bit rate and with a quality sufficient for most signaling information to arrive uncorrupted. A signaling connection, when used, is to a large extent also independent of the parameters of the "data connection" it may be associated with.

Further, it is understood that the terms "user data" and "user terminal" do not necessarily imply a presence of a human user and the embodiments of the present invention may also be applicable to e.g. a smartphone checking e-mail without human intervention and to machine-to-machine (M2M) communications. The term "user data" is merely used to differentiate between the actual data that is to be exchange over the data connection and the signaling.

As described herein, a terminal may be either in an "active mode" or an "idle mode." As used herein, the expression "a terminal in an idle mode" refers to a terminal that is neither exchanging user data nor able to exchange user data but is camping on a LA-cell and is monitoring possible paging messages for the terminal from the LA-cell. In other words, the expression "a terminal in an idle mode" is used to describe a terminal which does not have support for the wireless exchange of user data between the terminal and an SA-cell. In contrast, the expression "a terminal in an active mode" refers to a terminal that is either exchanging user data or able to exchange user data via at least one SA-cell. In other words, an active terminal supports or is able to support the wireless exchange of user data between the terminal and the SA-cell(s). These notions of idle mode and active mode may be comparable with like notions in standardized conventional networks but do not necessarily coincide exactly with standardized definitions.

In an embodiment the LA-cell can comprise the decision unit. In another embodiment the terminal can comprise the decision unit. This enable the network (via the LA-cell) or the terminal to be in control of the selection of the SA-cell.

In an embodiment the method can further comprise receiving an indication that the data connection is to be established between the terminal and the at least one of the plurality of SA-cells. The at least one of the plurality of SA-cells can be selected by the decision unit based on the report. An indication of the at least one of the plurality of SA-cells can be provided from the decision unit to the terminal.

If the decision unit is located at the LA-cell, the indication of the at least one of the plurality of SA-cells is typically transmitted to the terminal via the communication link between the LA-cell and the terminal. If the decision unit is located in the terminal, the indication of the at least one of the plurality of SA-cells is typically made available via a software interface in the terminal.

In an embodiment for each of the plurality of SA-cells the configuration data can comprise a unique transmission slot reference and/or a unique access preamble. The terminal can use the unique transmission slot reference and/or the unique access preamble as received with the configuration data in the broadcasting of the signal. Each of the plurality of SA-cells can use the unique transmission slot reference and/or the unique access preamble as received with the configuration data to differentiate the signal from other signals of other terminals.

The unique transmission slot reference or unique access preamble can be used for avoiding collisions (i.e. mutual interference) of different transmissions by terminals attempting (possibly simultaneously) a session set-up with surrounding SA-cells.

In an embodiment two or more of the plurality of SA-cells can form a cluster. The SA-cells within the cluster can receive the same unique transmission slot reference and/or the same unique access preamble with the configuration data.

By forming a cluster of SA-cells, multiple SA-cells can be addressed at once, which can increase the efficiency of the SA-cell selection procedure.

In an embodiment the configuration data can comprise a time reference. The terminal can broadcast the signal at a time based on the time reference as received with the configuration data. Each of the plurality of SA-cells can use the time reference as received with the configuration data to determine a timing advance indicating a difference in time between the broadcasting of the signal and the reception of the signal in each of the plurality of SA-cells.

This enables the SA-cell random access procedure to overlap (at least partly) in time with the SA-cell selection procedure.

In an embodiment the method can further comprise transmitting timing advance information comprising the timing advance from the at least one of the plurality of SA-cells to the terminal.

Thus, the selected SA-cell (or the selected SA-cells if multiple SA-cells are selected) can transmit the timing advance information to the terminal to enable the terminal to communicate with the selected SA-cell(s) in accordance with the determined timing advance.

In an embodiment the configuration data can comprise an indication of a transmission power. The terminal can broadcast the signal using a transmission power that is based on the indication of the transmission power as received with the configuration data. Each of the plurality of SA-cells can use the indication of the transmission power as received with the configuration data to determine a path loss indicating a difference in transmission power at the terminal and a power of the signal as received in each of the plurality of SA-cells.

In an embodiment the method can further comprise reserving a transmission time slot in the SA-cell based on the configuration data before receiving the signal.

In an embodiment the signal can comprise data indicating an amount of required upload resources and/or download resources. Each of the plurality of SA-cells can use the data to determine if the required upload resources and/or download resources are available.

According to another aspect of the invention a telecommunication system is proposed that comprises means for performing one or more of the steps described above.

According to another aspect of the invention a SA-cell is proposed that comprises means for performing one or more of the steps described above.

According to another aspect of the invention a computer program product is proposed, which, when being executed by a processor, is adapted to perform one or more of the steps described above.

Hereinafter, embodiments of the invention will be described in further detail. It should be appreciated, however, that these embodiments may not be construed as limiting the scope of protection for the present invention.

BRIEF DESCRIPTION OF THE DRAWINGS

Aspects of the invention will be explained in greater detail by reference to the drawings, in which:

FIGS. 1 and 5 are schematic illustrations of coverage areas of the LA-cell and a plurality of SA-cells in a telecommunication network, according to exemplary embodiments of the invention;

FIGS. 6 and 7 are flow diagrams of methods according to exemplary embodiments of the invention.

DETAILED DESCRIPTION OF THE DRAWINGS

The present invention is an improvement of the session setup solutions as disclosed in patent application WO 2013/037875. The concept of information request message (IRM) transmission from the mobile terminal is extended in such a way that it is not only used for selecting the SA-cell that will serve the mobile terminal (i.e. set-up a data session with this SA-cell) but also simultaneously performs a 'contention-free-like' random-access procedure towards all candidate SA-cells. In this way performing a $RACH_{SA}$ procedure after selecting a SA cell becomes unnecessary, the random access time is shortened and the uplink resources (at the selected SA-cell) and the uplink transmissions from the terminal are more effectively used.

In the following examples IRM messages are used to transmit (i.e. broadcast) a signal from a terminal to one or more SA-cells. It is to be understood that the invention is not limited to the use of IRM messages. Any other kind or form of messages may be used to transmit the signal from the terminal to the SA-cells.

Figure 1:
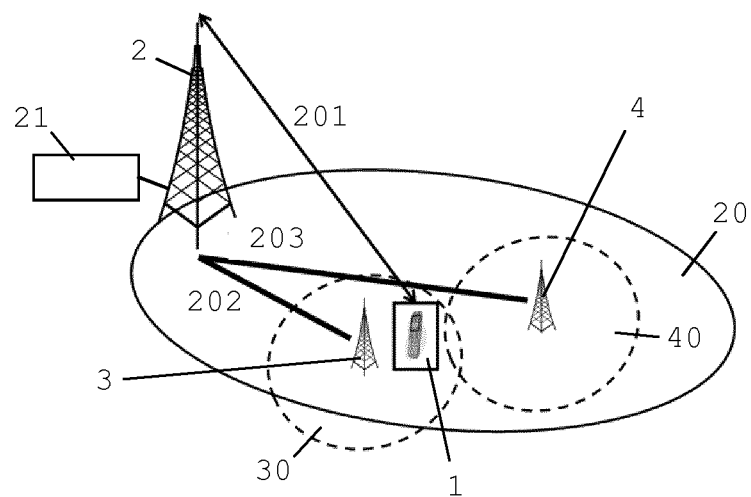

In the exemplary embodiment of FIG. 1, a LA-cell 2 having a coverage area 20, a decision unit 21 of the LA-cell 2, two SA-cells 3,4 having coverage areas 30,40, respectively, a mobile terminal 1 and communication links 201, 202,203 used in setting up a mobile session in an SA-cell are shown. The communication link 201 between the terminal 1 and the LA-cell 2 is typically a wireless connection. The communication links 202 and 203 between the SA-cells 3 and 4, respectively, and the decision unit 21 (possibly but not necessarily via the LA-cell 2) may be wireless connections, fixed line connections or a combination thereof.

The decision unit 21 is a unit which may exchange messages with the terminal 1 and with one or more of the SA-cells 3,4. In some embodiments, as described in greater detail below, the decision unit 21 may be configured to select one or more SA-cells 3,4 with which the terminal 1 may establish a data connection. To that end, in one embodiment, the decision unit 21 may include at least a communications interface for exchanging messages, a memory for storing data (possibly received in the messages) and/or computer program instructions, and a processor for processing data, running computer programs, etc. In other embodiments, the decision unit 21 may be implemented in software or in firmware. In yet other embodiments, the decision unit 21 may be implemented as any combination of hardware, software, and firmware.

In the illustrative embodiment of FIG. 1 the decision unit 21 is shown to be a part of the LA-cell 2. However, in other embodiments, the decision unit 21 may be not included in the LA-cell 21, but be a stand-alone unit, be included in a further network node, or be distributed between two or more network nodes (e.g. a part of the functionality of the decision unit 21 may be implemented within the LA-cell 2, while another part may be implemented in a further network node, not shown in FIG. 1). Unless indicated otherwise, discussions provided herein with respect to the decision unit 21 apply both to the embodiments where the decision unit 21 is a part of the LA-cell 2 and where the decision unit 21 is implemented outside of the LA-cell 2.

The LA-cell 2 is an LA-cell configured to at least be able to enable terminal 1 to camp on LA-cell 2 and to page the terminal 1 in a conventional manner known in the art. According to some embodiments of the present invention, the LA-cell 2 may be configured to receive service request messages (SRMs) from the terminal 1 indicating that a data connection needs to be established between the terminal 1 and one of the SA-cells 3,4 for supporting wireless traffic (i.e. wireless exchange of user data), not shown in FIG. 1. While the LA-cell 2 is not primarily intended to be used to carry wireless user data from/to the terminal 1, it is not precluded that other signaling than paging or that also some user data traffic is carried via the LA-cell 2, for example low bit rate traffic (such as a voice call) for the full duration or for a part of the duration of the data session (call).

In comparison with the SA-cells 3 and 4, the LA-cell 2 is configured to cover a larger geographical area typically with a smaller bit rate. The geographical area where an idle terminal selects the LA-cell to camp on is referred to as the coverage area 20 of the LA-cell 2. In a properly dimensioned cell, a terminal 1 within that area 20 is usually also capable of successfully receiving the system information and signaling messages from the LA-cell 2 (for example a paging message). This is assumed to also apply in the reverse direction, i.e. when a terminal 1, camping on an LA-cell 2, transmits a signaling message (for example a service request message) to the LA cell it is camping on, the LA cell is usually capable of successfully receiving the message. In FIG. 1 the communication between the terminal 1 and the LA-cell 2 is indicated by the arrow between these two elements. In the intended coverage area 20 of the wireless access network it may be assumed that at least one LA-cell (in FIG. 1, the LA-cell 2) is fully operational or 'normally on' and is capable of supporting exchange of signaling messages with the terminals 1. In a simplest embodiment, this may mean that the LA-cell 2 is always fully functional ('on'). In other embodiments, power-saving options suitable for LA-cells may be applied to the LA-cell 2, meaning that the LA-cell 2 would not necessarily always be 'on'.

The terminal 1 may be a terminal operated by an actual human user, such as e.g. a mobile phone with which the user can make a voice call or browse the Internet, but may also be a smart phone or a blackberry operating without human intervention (e.g. sending/receiving e mail), and may also be an M2M device, such as e.g. a smart electricity meter or a camera surveillance device.

The terminal 1 may be in an active mode or in an idle mode. As used herein, the terminal 1 is said to be in an idle mode while there is no support for a wireless exchange of user data or traffic between the terminal 1 and the SA-cells 3 or 4. As used herein, the terminal 1 is said to be in an active mode when it is able to exchange data with at least one of the SA-cells 3, 4. Note that while these notions of idle mode and active mode may be comparable with the meaning of like terms in standardized conventional networks, as used herein, they do not necessarily coincide exactly with such standardized definitions.

Further, the terminal 1 may support some form of power-saving options (i.e., be in a power-save mode or in an operational mode, where the terminal consumes less power in the power-save mode than in the operational mode). Since the differentiation between power-save and operational modes is based on the amount of power consumed by the terminal, while the differentiation between idle and active modes is based on the presence of the support for wireless exchange of user data with the SA-cells, a terminal may e.g. be in the operational mode but still be an idle terminal (or the terminal in the operational mode may be in active mode). Similarly, a terminal in a power-save mode can be either active or idle, depending on whether the terminal supports wireless exchange of user data with at least one of the SA-cells. Most common, however, would be a situation where an idle terminal in a power-save mode "wakes up" (i.e. exits the power-save mode and enters the operational mode) to perform certain actions to facilitate establishment of a data connection with at least one SA-cell, after which the terminal becomes "active" (and operational). Since the embodiments of the present invention deal with a session setup for the terminal (i.e. establishment of a data connection with one or more SA-cells), in the following description, the differentiation is mainly made between idle and active modes of the terminal.

The terminal 1 in an idle mode may be assumed to 'camp' on at least the LA-cell 2, which may also be realized in a conventional manner. For example, the LA-cells may broadcast a pilot signal or a beacon signal which can be received by the terminal 1 which then uses the information contained in the received signal to select or reselect the LA-cell to camp on. In FIG. 1, the signals transmitted by LA-cell 2 and received by the terminal 1 are illustrated as a solid arrow. In an embodiment, the terminal 1 may be capable of informing the network about the change of location/routing area in order to facilitate the paging function of the LA-cell 2, not shown in FIG. 1.

The SA-cells 3 and 4 are data cells, primarily intended to carry user data traffic from/to the terminal 1 over the data connections (not shown in FIG. 1) established for that purpose. However, it is not precluded that also some other information and/or some signaling is carried via one or more of the SA-cells.

Each of the SA-cells 3 and 4 are intended to be capable of covering smaller areas with a higher bit rate, as opposed to the LA-cell 2. In a typical deployment scenario, the areas that can possibly be covered by nearby SA-cells may show a considerable overlap. In the intended coverage area of the wireless access network it may be assumed that at least one of the SA-cells 3,4 is able to provide coverage. An SA-cell is only fully operational when and to the extent that it is needed or, in other words, is 'normally off'. An SA-cell is assumed to support at least one form of power-saving, e.g. a power-save mode or stand-by mode.

Each of the terminal 1, the LA-cell 2 and the SA-cells 3,4 may include at least one or more of a processor, a memory unit, and a communications interface configured for carrying out functionalities of these units described herein.

Embodiments of the invention are based on the idea that a terminal 1 in idle mode is configured to emit signals which the SA-cells 3,4 are able to receive. While still in the idle mode and camping on the LA cell 2, the SA-cells 3,4 are configured to analyze the received signals. More specifically, the SA-cell 3,4 is configured to determine properties representing propagation conditions of the received signals, such as e.g. a signal strength, a path loss estimate and/or a timing advance for the signal. The SA-cells are also configured to provide a report to the decision unit 21, possibly but not necessarily via the LA-cell 2, containing at least the information regarding at least some of the determined properties. Based, at least partially, on the information contained in the report received from the SA-cells 3,4, the decision unit 21 is then able to make a selection of at least one of the SA-cells in the telecommunications network to serve the terminal 1. In other words, the decision unit 21 is able to select one or more SA-cells 3,4 with which the terminal 1 could establish the data connection for exchanging user data.

The exemplary embodiment of FIG. 5 is similar to the exemplary embodiment of FIG. 1, with the exception of the decision unit (11) being located in the terminal (1) instead of at the LA-cell (2). The explanation to FIG. 1 above therefore also applies to FIG. 5. In FIG. 5 the SA-cells are configured to provide the report to the decision unit 21 via the LA-cell 2 and the communication link 201. In this manner, the SA-cells 3,4 facilitates establishment of the data connection between the terminal 1 and one of the SA-cells by providing to the decision unit 11 information regarding the propagation conditions between the terminal 1 and various SA-cells. When the decision unit 11 has such information available, a selection of the most appropriate SA-cell for establishing the data connection may be performed quicker and/or more accurately.

As a first step the terminal 1 may finish its LA-cell random access procedure $RACH_{LA}$ using the communication link between the terminal 1 and the LA-cell 2. After the $RACH_{LA}$ procedure the mobile terminal 1 is configured for the 'contention free' IRM transmission with the unique IRM transmission slot reference or unique access preamble (signaled by the LA-cell 2 in the $RACH_{LA}$ reply). The mobile terminal 1 is also configured for the IRM transmission with regards to e.g. UL power, time reference, etcetera, as may be needed for making the SA-cell selection.

Figure 3:
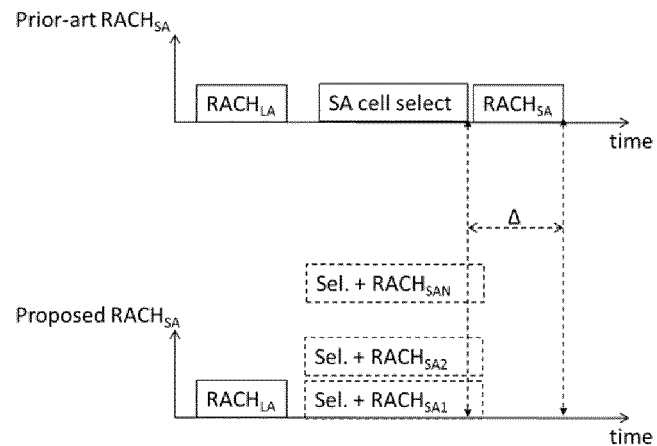
FIG. 3 is a time diagram comparing a prior art $RACH_{SA}$ procedure with a $RACH_{SA}$ procedure of an exemplary embodiment of the invention.

Optionally, with the $RACH_{LA}$ reply towards the terminal 1 via the LA-cell 2, the network (e.g. via the decision unit 11,21) may further prepare the terminal 1 for faster access of one or more SA-cells 3,4 from the selected candidate SA-cell as follows:

a) The $RACH_{LA}$ reply may contain e.g. the Temporary Network Identifier (TNI) used by the terminal 1 during the data session with any of the candidate SA-cells 3,4. By contrast, if a RACH procedure as in known/legacy systems is followed the TNI would be received at the terminal from the network in a $RACH_{SA}$ reply after one or more SA-cells are selected. The $RACH_{SA}$ message is becoming obsolete in the present invention, as is also illustrated in FIG. 3.

b) The $RACH_{LA}$ reply may contain a list of Master Information Blocks (MIBs) for any of the candidate SA-cells (including the physical uplink control channel configuration—PUCH) so the terminal does not need to listen to the SA-cell system info broadcast or get the PUCH configuration from the selected one ore more SA-cells via the respective $RACH_{SA}$ reply (which is becoming obsolete in the present invention, as also illustrated in FIG. 3).

Further, the contention-free IRM transmission by the mobile terminal may be done as follows:

a) The mobile terminal may utilize the unique time-slot reference from the LA-cell for the IRM transmission. In this case no IRM transmission collision occurs as only one terminal can use the allocated IRM transmission slot making also the access preamble configuration unnecessary.

b) The mobile terminal may transmit the IRM by using the unique access preamble (similarly as in legacy systems) assigned to the mobile terminal by the LA-cell in combination with a time-slot reference for the IRM transmission. In this case two (or more) IRM transmissions can collide but the candidate SA-cells can differentiate the IRM messages based on the unique access preamble.

As a second step, next to the $RACH_{LA}$ reply to the terminal 1 the decision unit (11,21), possibly but not necessarily via the LA-cell 2, may convey the same IRM time reference and the IRM configuration, as communicated to the mobile terminal 1 in the $RACH_{LA}$ reply, via a backhaul link to the relevant candidate SA-cells 3,4. In FIG. 1 the backhaul links are shown as the communication link between the left SA-cell 3 and the LA-cell 2 and the communication link between the right SA-cell 4 and the LA-cell 2. The IRM time reference may be send by the LA-cell for example as relative to the system clock of the SA-cells in its neighbor list if the pair-wise (LA-cell and SA-cell) relative offset of the respective system clocks is known or in absolute reference manner if both LA-cell and SA-cell are time synchronized. This time synchronization or time-offset knowledge is prerequisite for the candidate SA-cells to estimate a correct/proper timing advance, as it will be explained below. Note here that a joint time-reference is given for all candidate SA-cells, which either is instructed by the LA-cell or there is cooperation among the candidate SA-cells and the LA-cell to find a joint time reference.

Figure 2:
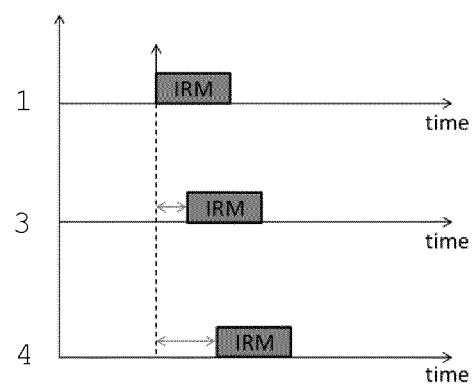
FIG. 2 is a time diagram showing IRM messages transmitted according to an exemplary embodiment of the invention.

Based on the received time reference and the IRM configuration the candidate SA-cells 3,4 can receive and differentiate among the different IRM messages from mobile terminals trying to access a particular SA-cell 3,4. Next to the signal strength measurements of the received IRM messages that may be needed for selecting the serving SA-cell each candidate SA-cell may precisely define one or more of the following:

a) Derive the uplink timing advance (if needed for the SA-cell radio interface) based on the time difference when the IRM was transmitted (as configured and communicated by the LA-cell) and the actual time when the IRM was received. The timing advance is illustrated in FIG. 2 with the horizontal arrows indicating a difference between the time of transmission of the IRM from the terminal 1 (illustrated by the top time diagram) and reception of the IRM at the SA-cells 3 and 4 (illustrated by the middle and bottom diagrams, respectively). Note in FIG. 2 the shorter time interval for the IRM reception at the left SA-cell 3 relative to the right SA-cell 4 as the mobile terminal 1 in FIG. 1 is closer to the left SA-cell 3 than the right SA-cell 4. The SA-cell and the terminal may get actually in sync (if needed for that particular SA-cell) based on the determined timing advance relevant for that particular SA-cell, if the particular SA-cell is selected to serve the terminal. The timing advance can be signaled to the terminal 1 via the LA-cell 2 along with the instruction to which SA-cell the terminal 1 should set-up its data connection.

b) Derive the path-loss between the terminal and the respective SA-cell based on the received uplink IRM power and the knowledge of the IRM transmit power at the mobile terminal as configured and communicated by the LA-cell. This information is needed for the SA-cell selection. The selected SA-cell may signal back to the terminal 1 the path-loss estimation (possibly next to the timing advance in a) above) for UL transmission purpose. The SA-cell may convey the path-loss estimation information to the terminal via the LA-cell along with the instruction to which SA-cell the UE should set-up its data connection.

c) What kind and what amount of UL and DL communication resources are required for the requested communication service (e.g. voice, video, WWW, etc.) as this service request is encoded in the IRM message. This information may be needed for the SA-cell selection.

In FIG. 3 a comparison is shown between a prior art $RACH_{SA}$ procedure and the proposed improved session setup procedure. Herein, the top diagram shows a $RACH_{SA}$ procedure of the prior art and the bottom diagram shows a proposed procedure of an exemplary embodiment of the present invention. In the prior art solution a $RACH_{LA}$ procedure is executed before the serving SA-cell selection phase. Afterwards, a full random access procedure $RACH_{SA}$ is executed towards the selected SA-cell. With the proposed solution, shown in the bottom diagram, there is a combined SA-cell selection procedure and a parallel $RACH_{SA}$ with all N candidate SA-cells (i.e. $SA_1$, $SA_2$, ..., $SA_N$) that received the IRM message. Herein, $SA_1$ may be the left SA-cell 3 and $SA_2$ may be the right SA-cell 4 of FIG. 1 or FIG. 5. The other SA-cells $SA_3$ ... $SA_N$ are not shown in the examples of FIG. 1 and FIG. 5. This approach is resource efficient as it avoids the full random access procedure $RACH_{SA}$ and it reduces the random access delay. The delay reduction can be ideally up to the whole Δ time interval as indicated in FIG. 3, depending on the time needed for the processing of the joint SA-cell selection and $RACH_{SA}$ procedure in the prior art.

Note that with the definition of the time advance (if needed), determination of the path-loss towards the SA-cell and parts of the configuration in the $RACH_{LA}$ reply (e.g. TNI, PUCH configuration, etc.), the selected SA-cell and the terminal may configure all necessary configuration settings without the need for a separate $RACH_{SA}$ procedure. As a consequence the IRM transmission by the UE and its reception and analysis at the particular SA-cell can be jointly used for selecting the proper SA-cell but also simultaneously perform a virtual $RACH_{SA}$ procedure with the candidate SA-cells.

The present invention extends the IRM message concept for selecting a SA-cell in the prior art session set-up as follows.

Firstly, the LA-cell may configure a unique IRM transmission time-slot in agreement with or instructing the candidate SA-cells. This uniqueness of the IRM transmission time-slot as coordinated by the LA-cell is desired for avoiding collisions (i.e. mutual interference) of different IRM transmissions by terminals attempting (possibly simultaneously) the session set-up with the surrounding SA-cells. The following is important regarding this unique IRM transmission time-slot:

a. The IRM transmission time-slot is preferably reserved on the radio access technology (RAT) and/or frequency as used by the candidate SA-cells. This enables exact determination of e.g. the timing advance in LTE.

b. A unique IRM transmission time-slot may not be necessary if there is unique access preamble per mobile terminal that can be used for 'decoding' the terminal ID and received signal strength from the IRM message reception at the SA-cell.

c. Because the IRM transmission is received at multiple SA-cells, as part of the 'virtual parallel' $RACH_{SA}$ procedure, the time configuration of the selected time slot in terms of starting moment and length is preferably agreed upon/suitable for all the candidate SA-cells. This may be done by the LA-cell in cooperation with the relevant SA-cells.

Note that in c) above the UE might wait longer and transmit longer IRM message when compared with the prior art $RACH_{SA}$ procedure with only single SA-cell. This potential 'efficiency loss' depends on how different the uplink load conditions are at the candidate SA-cells and what is the propagation time difference between the UE and each candidate SA-cell.

Figure 4:
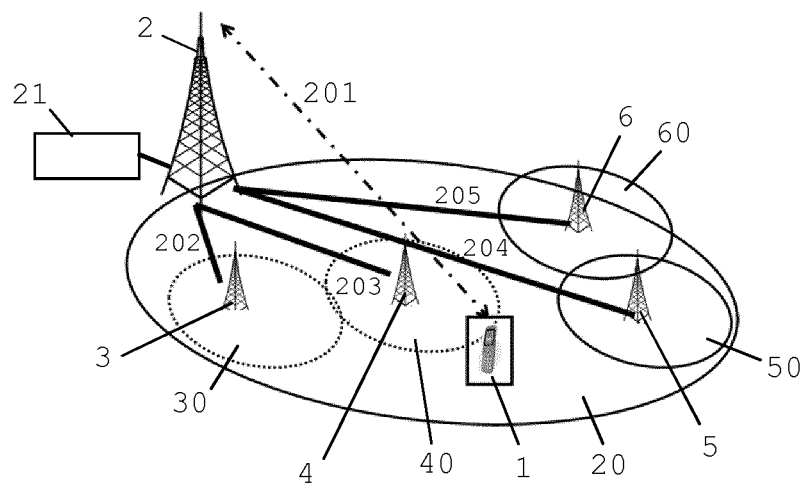
FIG. 4 is a schematic illustration of coverage areas of the LA-cell and a plurality of SA-cells in a telecommunication network, according to an embodiment of the invention.

Although, this efficiency loss is not significant it may be reduced by grouping SA-cells in clusters, as shown in FIG. 4. In the example of FIG. 4 elements used and described in FIG. 1 are shown again. The explanation given to the elements in FIG. 1 similarly applies to the elements in FIG. 4. In FIG. 4, SA-cells 3,4 and 5,6 in close vicinity of each other may be grouped in clusters for which the LA-cell 2 administers unique IRM transmission slots and assigns unique access preambles for the IRM transmissions by the mobile terminals 1. This is illustrated in FIG. 4 with only two SA-cell clusters (four candidate SA-cells) for clarity reasons. In FIG. 4 two SA-cells 3 and 4 with dashed lines form a first cluster and two SA-cells 5 and 6 with solid lines form a second cluster. Communication links 202, 203, 204 and 205 are used for the communication between the SA-cells 3, 4, 5 and 6, respectively, and the LA-cell 2. The LA-cell informs the terminal 1 about the $RACH_{SA}$ configuration per SA-cell cluster via the radio signaling link 201. For example, the length and position of the IRM transmission slot as well as the unique access preamble per cluster may be signaled to the terminal 1 from the LA-cell 2 via the signaling radio link 201 as configuration data.

Next, the mobile terminal 1 may execute the IRM transmission in the (preferably unique) time-slot as configured and signaled by the LA-cell 2 along with the following configuration parameters by the LA-cell 2:

a. The unique random access preamble if the IRM transmission slot is not uniquely assigned to the mobile terminal 1 (e.g. if IRM transmission collisions in the time domain are possible).

b. The transmit power as instructed by the LA-cell. This may also be needed for the SA-cell selection (i.e. as in prior-art).

In an alternative embodiment, which is not shown in the figures, the terminal may not send an IRM message for the purpose of SA-cell selection. Instead the terminal measures SA-cells pilot signals and forwards these measurements results to the decision unit to be used in the selection of the SA-cell. However, the terminal may still send IRM message to the measured SA-cells (as instructed by the LA-cell) for the timing advance estimation at the SA-cells (thus not for SA-cell selection) while the SA-cell selection is in progress (i.e. not yet finished).

In FIG. 6 a flow diagram is shown of a method for facilitating establishment of a data connection between a terminal 1 and at least one of a plurality of the SA-cells. The method may e.g. be used in the examples shown in FIG. 1 and FIG. 5. The steps of the method are typically performed while the terminal 1 is in an idle mode and is camping on the LA-cell 2. In step 101 a signaling connection 201 is established between the terminal 1 and the LA-cell 2. In step 102 configuration data is transmitted from the LA-cell 2 to the terminal 1 via the signaling connection 201. In step 103 the configuration data is transmitted from the LA-cell 2 to the plurality of SA-cells. The dashed line around steps 102 and 103 indicates that the order of these steps may be altered or that these steps may be performed in parallel. In step 104 a signal is broadcast from the terminal 1 in accordance with the configuration data. In step 105 in each of the plurality of SA-cells 3,4 one or more properties of the signal is determined. The properties may be indicative of propagation conditions between the terminal 1 and each of the plurality of SA-cells 3,4. In step 106 a report is provided to the decision unit 11,21 from each of the plurality of SA-cells 3,4. The report may be provided via the LA-cell 2 (e.g. when the decision unit 11 is located at the terminal 1), via a direct connection (e.g. when the decision unit 21 is located in the network) or via other intermediate nodes in the network (e.g. when the decision unit 21 is located in the network). The report may contain data indicative of at least a portion of the determined properties.

In FIG. 7 a flow diagram is shown of a method for one of the plurality of SA-cells for facilitating establishment of a data connection between a terminal 1 and a SA-cell. The method may e.g. be used in the examples shown in FIG. 1 and FIG. 5. The steps of the method are typically performed while the terminal 1 is in an idle mode and is camping on the LA-cell 2. In step 107 configuration data is received from the LA-cell 2 in the SA-cell 3,4. The configuration data may be, at least partly, identical to configuration data received from the LA-cell in the terminal. In step 108 in the SA-cell a broadcasted signal is received from the terminal 1. The signal may be broadcast in accordance with the configuration data.

In step 105 in the SA-cell one or more properties of the signal are determined. The properties may be indicative of propagation conditions between the terminal 1 and the SA-cell. Step 105 in FIG. 7 and step 105 in FIG. 6 may be identical. In step 106 a report is provided to the decision unit 11,21 from the SA-cell. The report may comprise data indicative of at least a portion of the determined properties. Step 106 in FIG. 7 and step 106 in FIG. 6 may be identical.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory or flash memory) on which alterable information is stored. Moreover, the invention is not limited to the embodiments described above, which may be varied within the scope of the accompanying claims.

The invention claimed is:

1. In a telecommunication system comprising a decision unit, a large area cell (LA-cell), a plurality of small area cells (SA-cells) and a terminal, a method for facilitating establishment of a data connection between the terminal and at least one of the plurality of the SA-cells, the method comprising:
    while the terminal is in an idle mode and is camping on the LA-cell:
        establishing a signaling connection between the terminal and the LA-cell;
        transmitting configuration data from the LA-cell to the terminal via the signaling connection;
        transmitting the configuration data from the LA-cell to the plurality of SA-cells;
        broadcasting a signal from the terminal in accordance with the configuration data;
        determining in each of the plurality of SA-cells one or more properties of the signal, the properties being indicative of propagation conditions between the terminal and each of the plurality of SA-cells; and
        providing a report to the decision unit from each of the plurality of SA-cells, the report comprising data indicative of at least a portion of the determined properties.

2. The method according to claim 1, wherein the LA-cell comprises the decision unit.

3. The method according to claim 1, wherein the terminal comprises the decision unit.

4. The method according to claim 1, further comprising receiving an indication that the data connection is to be established between the terminal and the at least one of the plurality of SA-cells, wherein the at least one of the plurality of SA-cells is selected by the decision unit based on the report, and wherein an indication of the at least one of the plurality of SA-cells is provided from the decision unit to the terminal.

5. The method according to claim 1, wherein for each of the plurality of SA-cells the configuration data comprises a unique transmission slot reference and/or a unique access preamble, wherein the terminal uses the unique transmission slot reference and/or the unique access preamble as received with the configuration data in the broadcasting of the signal, and wherein each of the plurality of SA-cells uses the unique transmission slot reference and/or the unique access preamble as received with the configuration data to differentiate the signal from other signals of other terminals.

6. The method according to claim 5, wherein two or more of the plurality of SA-cells form a cluster, and wherein the SA-cells within the cluster receive the same unique transmission slot reference and/or the same unique access preamble with the configuration data.

7. The method according to claim 1, wherein the configuration data comprises a time reference, wherein the terminal broadcasts the signal at a time based on the time reference as received with the configuration data, and wherein each of the plurality of SA-cells uses the time reference as received with the configuration data to determine a timing advance indicating a difference in time between the broadcasting of the signal and the reception of the signal in each of the plurality of SA-cells.

8. The method according to claim 1, further comprising transmitting timing advance information comprising the timing advance from the at least one of the plurality of SA-cells to the terminal.

9. The method according to claim 1, wherein the configuration data comprises an indication of a transmission power, wherein the terminal broadcasts the signal using a transmission power that is based on the indication of the transmission power as received with the configuration data, and wherein each of the plurality of SA-cells uses the indication of the transmission power as received with the configuration data to determine a path loss indicating a difference in transmission power at the terminal and a power of the signal as received in each of the plurality of SA-cells.

10. The method according to claim 1, further comprising reserving a transmission time slot in the SA-cell based on the configuration data before receiving the signal.

11. The method according to claim 1, wherein the signal comprises data indicating an amount of required upload resources and/or download resources, and wherein each of the plurality of SA-cells uses the data to determine if the required upload resources and/or download resources are available.

12. In a telecommunication system comprising a decision unit, a large area cell (LA-cell), a plurality of small area cells (SA-cells) and a terminal, a method for one of the plurality of SA-cells for facilitating establishment of a data connection between the terminal and the SA-cell, the method comprising: while the terminal is in an idle mode and is camping on the LA-cell:

receiving configuration data from the LA-cell in the SA-cell, the configuration data being, at least partly, identical to configuration data received from the LA-cell in the terminal;

receiving in the SA-cell a broadcasted signal from the terminal, wherein the signal is broadcast in accordance with the configuration data;

determining in the SA-cell one or more properties of the signal, the properties being indicative of propagation conditions between the terminal and the SA-cell; and providing a report to the decision unit from the SA-cell, the report comprising data indicative of at least a portion of the determined properties.

13. The method according to claim 12, wherein the LA-cell comprises the decision unit.

14. The method according to claim 12, wherein the terminal comprises the decision unit.

15. The method according to claim 12, wherein the configuration data comprises a unique transmission slot reference and/or a unique access preamble, wherein the SA-cell uses the unique transmission slot reference and/or the unique access preamble as received with the configuration data to differentiate the signal from other signals of other terminals.

16. The method according to claim 12, wherein the configuration data comprises a time reference, and wherein the SA-cell uses the time reference as received with the configuration data to determine a timing advance indicating a difference in time between broadcasting of the signal by the terminal and reception of the signal in the SA-cell.

17. The method according to claim 12, wherein the configuration data comprises an indication of a transmission power, and wherein the SA-cell uses the indication of the transmission power as received with the configuration data to determine a path loss indicating a difference in transmission power at the terminal and a power of the signal as received in the SA-cell.

18. The method according to claim 12, wherein the signal comprises data indicating an amount of required upload resources and/or download resources, and wherein the SA-cells uses the data to determine if the required upload resources and/or download resources are available.

19. A non-transitory computer-readable medium encoded with a computer program, which, when being executed by a processor, is adapted to perform the steps of claim 12.

* * * * *